US012595838B2

(12) United States Patent (10) Patent No.: US 12,595,838 B2
Hirata et al. (45) Date of Patent: Apr. 7, 2026

(54) CHAIN

(71) Applicant: TSUBAKIMOTO CHAIN CO., Osaka (JP)

(72) Inventors: Yuhi Hirata, Osaka (JP); Kazuyuki Ebinuma, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 352 days.

(21) Appl. No.: 18/117,965

(22) Filed: Mar. 6, 2023

(65) Prior Publication Data

US 2023/0287963 A1 Sep. 14, 2023

(30) Foreign Application Priority Data

Mar. 10, 2022 (JP) ................................. 2022-037131

(51) Int. Cl.
*F16G 13/06* (2006.01)
*F16G 13/08* (2006.01)
*F16G 15/12* (2006.01)
*F16G 13/07* (2006.01)

(52) U.S. Cl.
CPC ............. *F16G 13/06* (2013.01); *F16G 13/08* (2013.01); *F16G 15/12* (2013.01); *F16G 13/07* (2013.01)

(58) Field of Classification Search
CPC .......... F16G 13/06; F16G 13/07; F16G 13/08; F16G 15/12
See application file for complete search history.

(56) References Cited

U.S. PATENT DOCUMENTS

| 3,831,240 | A | * | 8/1974 | Boggs | F16N 21/06 |
| | | | | | 29/891.1 |
| 6,213,904 | B1 | * | 4/2001 | Tanaka | F16G 13/06 |
| | | | | | 474/209 |
| 2004/0114993 | A1 | * | 6/2004 | Anderton | F16G 13/06 |
| | | | | | 403/154 |

(Continued)

FOREIGN PATENT DOCUMENTS

| EP | 1970596 A1 | 9/2008 |
| GB | 2449152 A | 11/2008 |

(Continued)

OTHER PUBLICATIONS

Extended (Supplementary)European Search Report dated Aug. 4, 2023, issued in counterpart EP Application No. 23160482.8. (7 pages).

*Primary Examiner* — Jared O Brown
(74) *Attorney, Agent, or Firm* — WHDA, LLP

(57) ABSTRACT

A chain with excellent wear resistance, which minimizes chain elongation, reduces vibration and noise, and improves drive efficiency; the chain includes at least a plurality of link plates and a plurality of pins as chain components. The pins and mutually sliding chain components sliding against the pins are formed with a hardened surface layer containing one of Cr carbide, Ti carbide, V carbide, Nb carbide, Cr nitride, Ti nitride, V nitride, and Nb nitride on part or all of respective sliding surfaces. In the case where the chain includes bushings as chain components and the bushings are the mutually sliding chain components, the bushings are formed with the hardened surface layer on part or all of their sliding surfaces.

6 Claims, 6 Drawing Sheets

(56)                  References Cited

U.S. PATENT DOCUMENTS

| | | | | |
|---|---|---|---|---|
| 2008/0227575 A1* | 9/2008 | Fujiwara | ................ | F16G 13/02 |
| | | | | 474/212 |
| 2008/0280716 A1 | 11/2008 | Miyazawa | | |
| 2009/0017950 A1* | 1/2009 | Sandro | ................... | F16G 13/06 |
| | | | | 474/231 |
| 2010/0035714 A1* | 2/2010 | Sandro | ................... | F16G 13/18 |
| | | | | 474/231 |
| 2010/0307128 A1* | 12/2010 | Shimada | ................ | F16G 13/04 |
| | | | | 59/85 |
| 2017/0058997 A1 | 3/2017 | Asada et al. | | |
| 2018/0283497 A1* | 10/2018 | Ebinuma | ................ | F16G 13/08 |

FOREIGN PATENT DOCUMENTS

| | | | | | |
|---|---|---|---|---|---|
| JP | S61-184246 A | 8/1986 | | | |
| JP | 2008-281027 A | 11/2008 | | | |
| JP | 6920607 B2 | 8/2021 | | | |
| WO | WO-03091599 A1 * | 11/2003 | ............. | F16G 13/10 |

* cited by examiner

CHAIN

BACKGROUND OF THE INVENTION

1. Field of the Invention

The present invention relates to a chain that includes at least a plurality of link plates and a plurality of pins as the chain components.

2. Description of the Related Art

Chains used in a chain drive system include roller chains, bushing chains, and silent chains, which are made up of inner links and outer links respectively including a plurality of inner plates and outer plates arranged in the chain width direction, these inner links and outer links alternately and pivotably coupled together by pins along the longitudinal direction of the chain.

To minimize wear of chain components in contact with each other in these various chains for better durability, it is the practice to fine-tune the respective surface roughnesses of the pins and mutually sliding chain components that slide against the pins, the surface treatment of the pins, and the forming method of the mutually sliding chain components.

For example, Japanese Patent Application Publication No. 2008-281027 describes a chain having pins covered with a chromium or vanadium carbide layer for better resistance to wear-induced elongation under the use of lubricating oil containing carbon soot, and for retarding abnormal wear caused by oil film shortage.

SUMMARY OF THE INVENTION

In conventional chains, the sliding surface of only one of the two chain components sliding against each other is treated with surface hardening, which increases aggressiveness of this chain component to the other chain component. This accelerates wear caused by the sliding contact between the chain components, and results in chain elongation.

Chain components without surface hardening have a sliding surface hardness (HV) in the range of 800 to 1000, for example. Therefore, contaminants such as silicon or alumina particles, if contained in the lubricating oil, may accelerate wear on the sliding surfaces of the chain components having a lower hardness than silicon or alumina, and may cause chain elongation.

Surface-treating chain components that slide against each other to improve the surface roughness of sliding surfaces of the chain will cause the lubricating oil to be retained less easily on the sliding surfaces, and accelerate abrasive wear when foreign substance or contaminant gets in between the sliding surfaces, which may eventually lead to chain elongation.

The present invention was made in view of the circumstances described above, its object being to provide a chain that has excellent wear resistance and can minimize chain elongation, reduce vibration and noise, and improve drive efficiency.

The present invention solves the above problem by providing a chain including at least a plurality of link plates and a plurality of pins as chain components, the pins and mutually sliding chain components sliding against the pins being formed with a hardened surface layer containing one of Cr carbide, Ti carbide, V carbide, Nb carbide, Cr nitride, Ti nitride, V nitride, and Nb nitride on part or all of respective sliding surfaces.

According to one aspect of the present application, the pins and mutually sliding chain components sliding against the pins are formed with a hardened surface layer containing one of Cr carbide, Ti carbide, V carbide, Nb carbide, Cr nitride, Ti nitride, V nitride, and Nb nitride on part or all of respective sliding surfaces. The hardened surface layer minimizes wear caused by the sliding contact between the pins and the mutually sliding chain components, and thus can retard chain elongation.

Minimized chain elongation ensures correct meshing with sprockets, which prevents loss of drive efficiency and reduces vibration and noise.

According to another aspect of the present application, wear caused by the sliding contact between pins and bushings is minimized in sliding parts formed by bushings and pins in a bushing chain, roller chain, or bushed silent chain, so that chain elongation is retarded.

According to another aspect of the present application, any physical contaminants that got in between the sliding surfaces of pins and mutually sliding chain components can be readily released, and lubricating oil can be retained more easily on the sliding surface of the mutually sliding chain components. This can further improve the wear resistance of the pins and the mutually sliding chain components, and help retard chain elongation more reliably.

Another aspect of the present application further ensures the effect of retarding chain elongation by improved wear resistance.

According to another aspect of the present application, wear on the sliding surfaces of the pins and mutually sliding chain components caused by physical contaminants can be reliably prevented even when contaminants such as silicon or alumina particles for example are contained in the lubricating oil, because the hardened surface layer of the pins and the hardened surface layer of the mutually sliding chain components each have a higher hardness than the contaminants.

According to another aspect of the present application, the bushings retain a certain sliding surface roughness even after some wear due to the sliding contact with the pins so that the bushings can provide the effect of releasing contaminants that get in between the pins and the bushings and the effect of retaining lubricating oil on the sliding surface of the bushings for a prolonged time. Thus the intended wear resistance can be maintained.

DESCRIPTION OF THE PREFERRED EMBODIMENTS

Below, the chain according to the embodiments of the present invention is described with reference to the drawings.

First Embodiment

Figure 1:
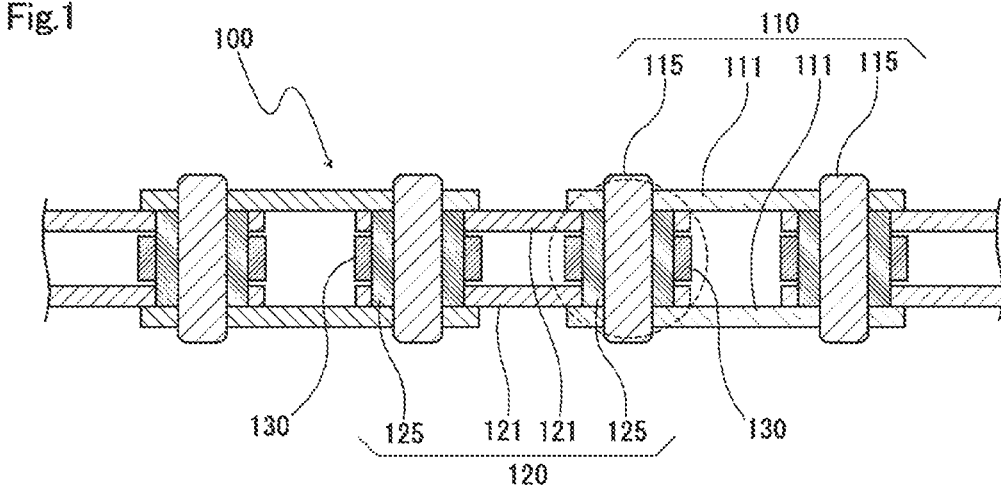
FIG. 1 is a cross-sectional view illustrating part of one configuration example of a chain according to a first embodiment of the present invention.

FIG. 1 is a cross-sectional view illustrating part of one configuration example of a chain according to a first embodiment of the present invention.

This chain 100 is configured as a roller chain and includes outer link plates 111, inner link plates 121, pins 115, bushings 125, and rollers 130 as the chain components.

The chain 100 includes: a plurality of outer links 110 each made up of a pair of left and right outer link plates 111 and a pair of front and rear pins 115 coupled thereto; a plurality of inner links 120 each made up of a pair of left and right inner link plates 121 disposed between the pair of left and right outer link plates 111 and a pair of front and rear cylindrical bushings 125 coupled thereto; and rollers 130 fitted on the bushings 125. These plurality of outer links 110 and inner links 120 are alternately and pivotably coupled together along the longitudinal direction of the chain by the pins 115 inserted in the bushings 125.

Figure 2:
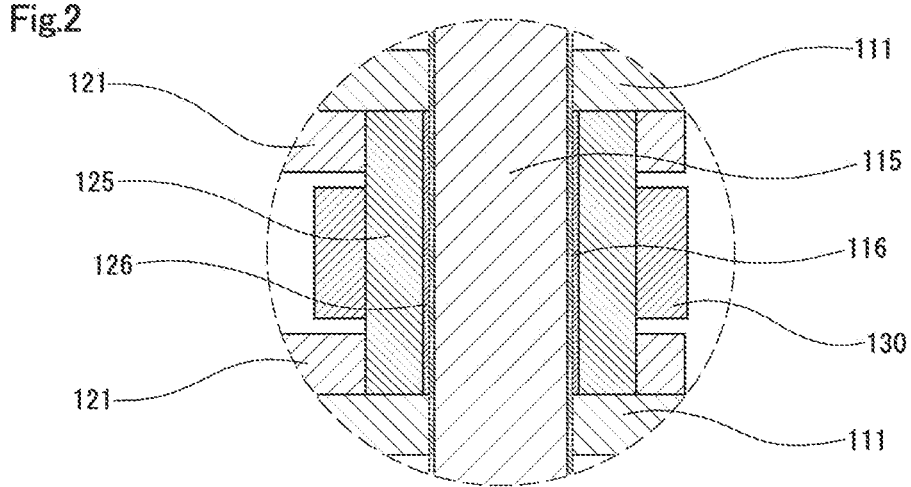
FIG. 2 is an enlarged view illustrating the part encircled with a broken line in FIG. 1.

In the chain 100 according to this embodiment, the pins 115, and bushings 125, which are mutually sliding chain components sliding against the pins 115, are formed with hardened surface layers 116 and 126 as shown in FIG. 2 containing one of Cr carbide, Ti carbide, V carbide, Nb carbide, Cr nitride, Ti nitride, V nitride, and Nb nitride on their entire sliding surfaces.

These materials, when used as the hardened surface layer, can provide a high surface hardness and reduce wear, compared to pins 115 made of a material hardened simply by a thermal process. Since the pins 115 as well as the bushings 125 are respectively formed with the hardened surface layers 116 and 126, the sliding against each other of the hardened surface layers 116 and 126 is less aggressive, so that the pins 115 and bushings 125 suffer less wear from mutual sliding. Thus elongation of the chain 100 is minimized.

While the pins 115 in the chain 100 of this embodiment have the hardened surface layer 116 covering their entire outer circumferential surface, the hardened surface layer 116 may cover at least part of the outer circumferential surface of the pins 115 that slides against the inner circumferential surface of the bushings 125.

The bushings 125 have the hardened surface layer 126 covering their inner circumferential surface, which is the sliding surface that slides against the outer circumferential surface of the pins 115. In an alternative configuration, the hardened surface layer may also be provided to both end faces of the bushings 125 that make contact with inner side faces of the outer link plates 111, and to an outer circumferential surface of the bushings 125 that makes contact with an inner circumferential surface of the rollers 130.

The hardened surface layers 116 and 126 should preferably have a thickness of 2 µm or more and 30 µm or less, for example, for ensuring good wear resistance and improved resistance to wear-induced chain elongation.

The hardened surface layer 116 of the pins 115 should preferably have a smaller sliding surface roughness than that of the hardened surface layer 126 of the bushings 125. Specifically, the sliding surface roughness Rk of the hardened surface layer 116 of the pins 115 should preferably be 0.04 µm to 0.30 µm, and the sliding surface roughness Rk of the hardened surface layer 126 of the bushings 125 should preferably be 0.8 µm to 2.0 µm.

Abrasive wear and oil film shortage can be effectively retarded by making the sliding surface roughness of the hardened surface layer 116 of the pins 115 smaller than that of the hardened surface layer 126 of the bushings 125. The sliding surface roughness values of the hardened surface layers 116 and 126 of the pins 115 and the bushings 125 being set within the respective ranges above also allow any physical contaminants that got in between the outer circumferential surface of the pins 115 and the inner circumferential surface of the bushings 125 to be readily released, and keep the lubricating oil retained more easily on the sliding surface of the bushings 125. This helps improve the wear resistance of the pins 115 and bushings 125 and minimize elongation of the chain 100.

The sliding surface roughness Rk here refers to the effective load roughness as defined by JIS B0671-2:2002 (which is the standard number of the Japanese Industrial Standards corresponding to ISO 13565-2:1996). Other surface roughness parameters may be employed, as long as the ranges of Rk values specified above are substantially covered.

The hardened surface layer 116 of the pins 115 and the hardened surface layer 126 of the bushings 125 should preferably each have a sliding surface hardness (HV) of 1600 or more and 3500 or less. This hardness is higher than that of silicon or alumina, so that abrasive wear on the respective sliding surfaces of the pins 115 and bushings 125 caused by physical contaminants can be reliably prevented even when high-hardness contaminants such as silicon or alumina particles are contained in the lubricating oil.

Figure 3:
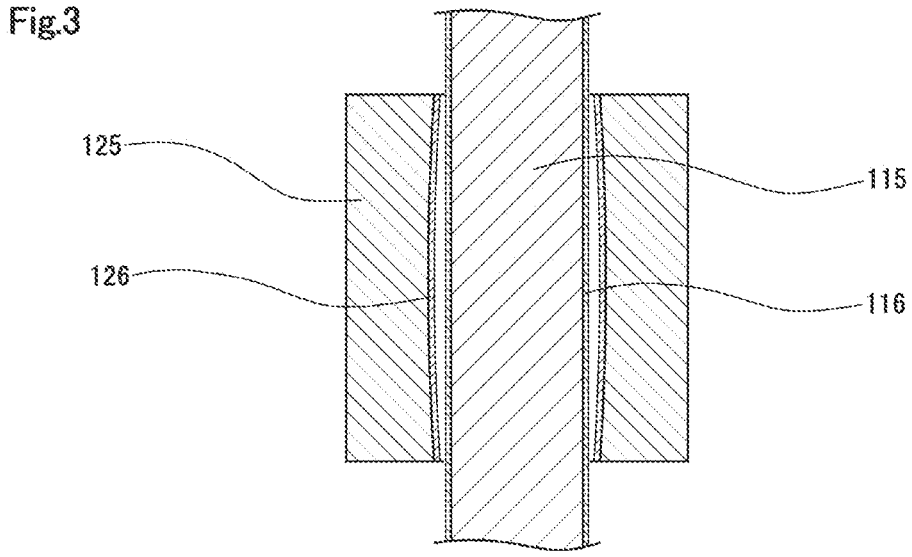
FIG. 3 is a schematic cross-sectional view illustrating an alternative configuration example of bushing.

The bushings 125 in the chain 100 of this embodiment are cylindrical, with its inner circumferential surface conforming to a cylindrical circumferential surface. Preferably, the bushings 125 should have a concave inner circumferential surface as shown in FIG. 3. This configuration allows the bushing 125 to keep its sliding surface roughness even after some wear caused by the sliding contact with the pin 115, and therefore any physical contaminants that got in between the outer circumferential surface of the pins 115 and the inner circumferential surface of the bushings 125 can be readily released, and the lubricating oil can be retained more easily on the sliding surface of the bushings 125. The wear resistance of the pins 115 and bushings 125 can thus be further improved.

Second Embodiment

While the chain described above is configured as a roller chain, the present invention is not limited to roller chains.

Figure 4:
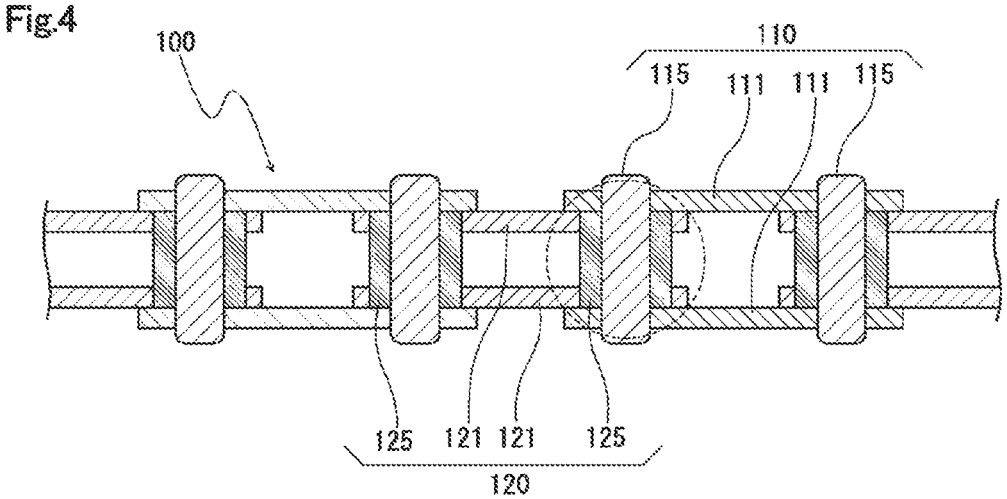
FIG. 4 is a cross-sectional view illustrating part of one configuration example of a chain according to a second embodiment of the present invention.
Figure 5:
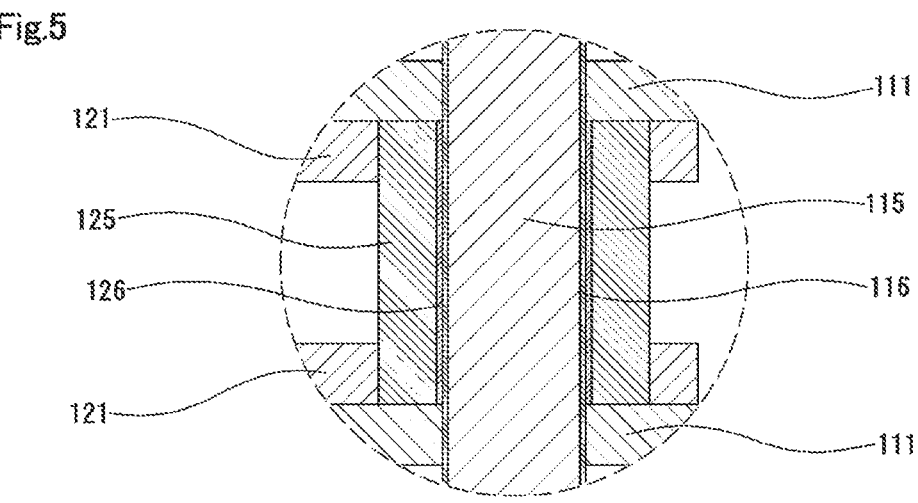
FIG. 5 is an enlarged view illustrating the part encircled with a broken line in FIG. 4.

For example, the chain according to the present invention may be configured as a bushing chain as shown in FIG. 4 and FIG. 5, which is similar to the roller chain according to the first embodiment but without the rollers on the bushings 125 of the inner links 120. The components in FIG. 4 and FIG. 5 that are the same as those of the roller chain according to the first embodiment are given the same reference numerals for convenience of description.

The chain 100 according to this embodiment includes outer link plates 111, inner link plates 121, pins 115, and bushings 125. The pins 115, and bushings 125, which are mutually sliding chain components sliding against the pins 115, are formed with hardened surface layers 116 and 126 containing one of Cr carbide, Ti carbide, V carbide, Nb carbide, Cr nitride, Ti nitride, V nitride, and Nb nitride on their entire sliding surfaces.

While the pins 115 in the chain of this embodiment have the hardened surface layer 116 covering their entire outer circumferential surface, the hardened surface layer 116 may cover at least part of the outer circumferential surface of the pins 115 that slides against the inner circumferential surface of the bushings 125.

The bushings 125 have the hardened surface layer 126 covering their inner circumferential surface, which is the sliding surface that slides against the outer circumferential surface of the pins 115. In an alternative configuration, the hardened surface layer may also be provided to both end faces of the bushings 125 that make contact with inner side faces of the outer link plates 111, and to an outer circumferential surface of the bushings 125 that makes contact with an inner circumferential surface of the rollers 130.

The bushings 125 in the chain 100 of this embodiment should also preferably have a concave inner circumferential surface.

Third Embodiment

Figure 6:
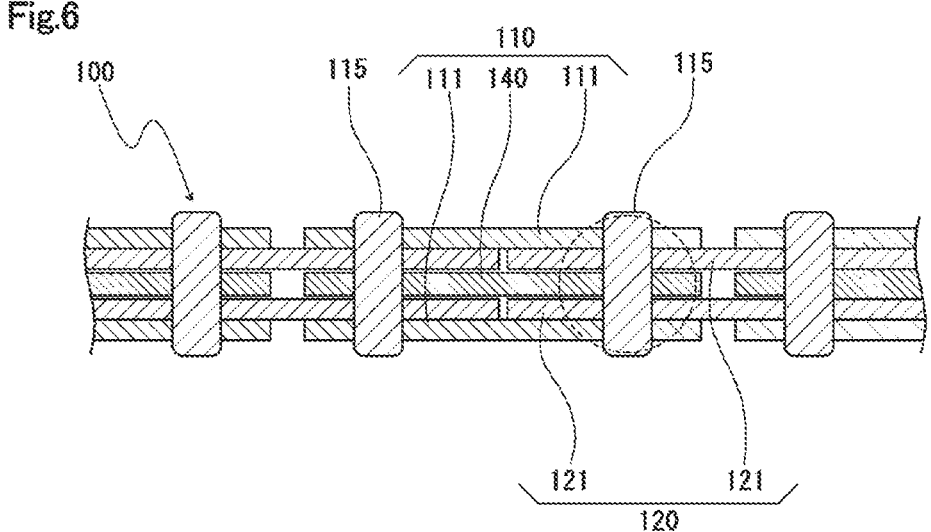
FIG. 6 is a cross-sectional view illustrating part of one configuration example of a chain according to a third embodiment of the present invention.

FIG. 6 is a cross-sectional view illustrating part of one configuration example of a chain according to a third embodiment of the present invention.

This chain 100 is configured as a silent chain and includes outer link plates 111, middle link plates 140, inner link plates 121, and pins 115 as the chain components.

More specifically, the chain 100 of this embodiment is made up of a plurality of outer links 110 that form guide rows, a plurality of inner links 120 that form non-guide rows, and pins 115 that couple together the outer links 110 and inner links 120 adjacent each other in the longitudinal direction alternately and pivotably along the longitudinal direction of the chain. The outer links 110 each include a pair of left and right outer link plates 111 formed with a pair of front and rear pin holes, and a middle link plate 140 disposed between the pair of left and right outer link plates 111 and formed with a pair of front and rear pin holes. The inner links 120 each include a pair of left and right inner link plates 121 each disposed between the outer link plate 111 and the middle link plate 140 and formed with a pair of front and rear pin holes.

These plurality of outer links 110 and inner links 120 are coupled together pivotably by the pins 115 with both ends fixedly pressed into the pin holes of the outer link plates 111, passed through the pin holes of the middle link plate 140, and loosely fitted in the pin holes of the inner link plates 121.

In the chain 100 of this embodiment, each outer link 110 has one middle link plate 140 and each inner link 120 has a pair of inner link plates 121. Instead, the chain may be configured with outer links 110 having two or more middle link plates 140 and inner links 120 having two or more pairs of inner link plates 121.

Figure 7:
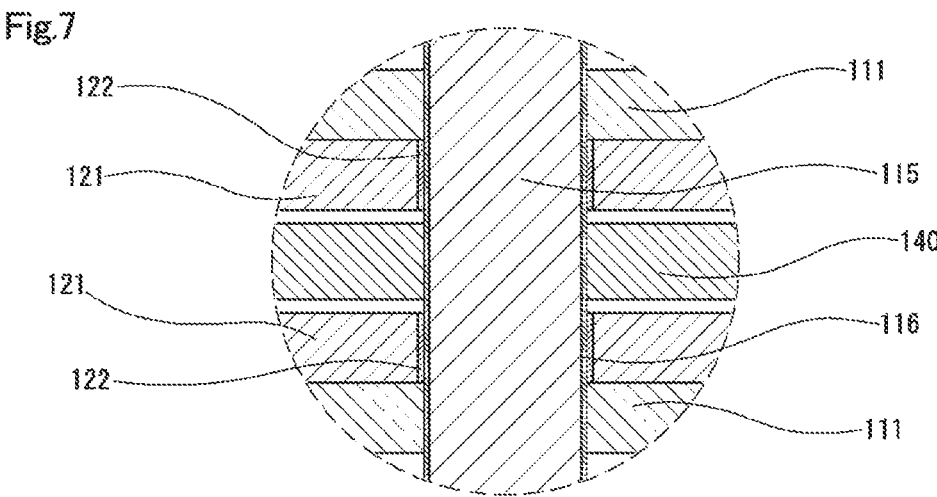
FIG. 7 is an enlarged view illustrating the part encircled with a broken line in FIG. 6.

In the chain 100 according to this embodiment, the pins 115, and inner link plates 121, which are mutually sliding chain components sliding against the pins 115, are formed with hardened surface layers 116 and 122 as shown in FIG. 7 containing one of Cr carbide, Ti carbide, V carbide, Nb carbide, Cr nitride, Ti nitride, V nitride, and Nb nitride on their entire sliding surfaces.

While the pins 115 have the hardened surface layer 116 covering their entire outer circumferential surface, the hardened surface layer 116 may cover at least part of the outer circumferential surface of the pins 115 that slides against the inner circumferential surface of the pin holes in the inner link plates 121.

The inner link plates 121 have the hardened surface layer 122 covering the inner circumferential surface of the pin holes, which is the sliding surface that slides against the outer circumferential surface of the pins 115. In an alternative configuration, the hardened surface layer may also be provided to both side faces of the inner link plates 121 that face the inner side faces of the outer link plates 111 and side faces of the middle link plate 140.

In the case where the chain according to the present invention is configured as a silent chain, it may be configured to include bushings 125 that are fitted on the pins 115 as shown in FIG. 8 to FIG. 11, i.e., as a bushed silent chain.

Fourth Embodiment

Figure 8:
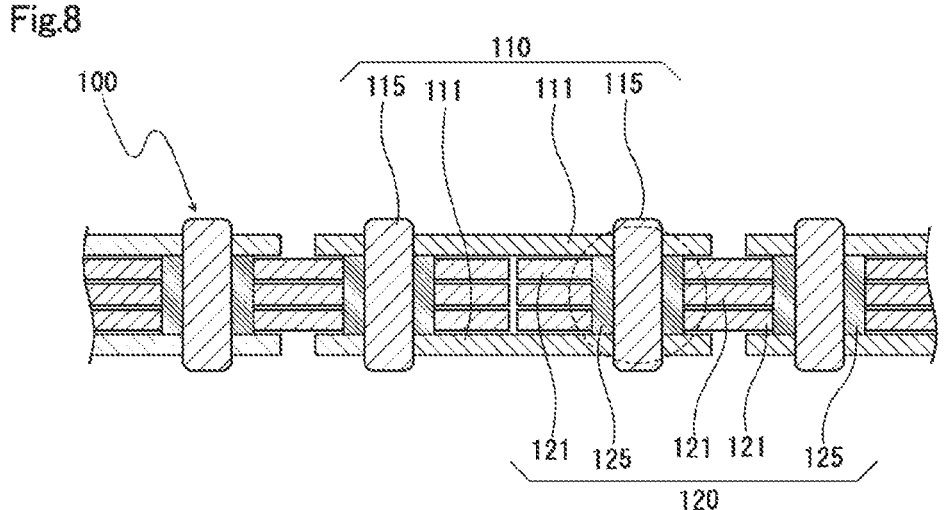
FIG. 8 is a cross-sectional view illustrating part of one configuration example of a chain according to a fourth embodiment of the present invention.

FIG. 8 is a cross-sectional view illustrating part of one configuration example of a chain according to a fourth embodiment of the present invention.

This chain 100 is configured as a bushed silent chain and includes outer link plates 111, inner link plates 121, pins 115, and bushings 125 as the chain components.

More specifically, the chain 100 of this embodiment includes: a plurality of outer links 110 each made up of a pair of left and right outer link plates 111 and a pair of front and rear pins 115 coupled thereto; and a plurality of inner links 120 each made up of a plurality of inner link plates 121 disposed between the pair of left and right outer link plates 111 and a pair of front and rear cylindrical bushings 125 coupled thereto. These plurality of outer links 110 and inner links 120 are alternately and pivotably coupled together along the longitudinal direction of the chain by the pins 115 inserted in the bushings 125.

Figure 9:
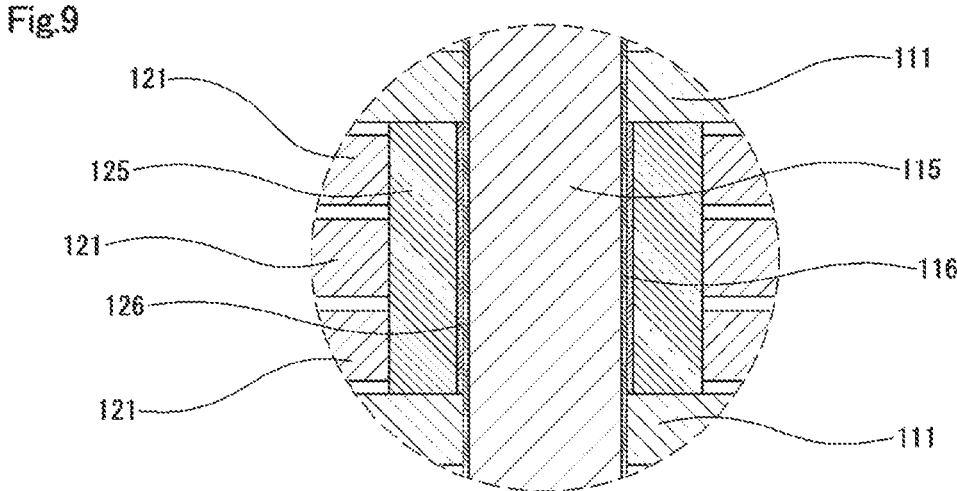
FIG. 9 is an enlarged view illustrating the part encircled with a broken line in FIG. 8.

In the chain 100 according to this embodiment, the pins 115, and bushings 125, which are mutually sliding chain components sliding against the pins 115, are formed with hardened surface layers 116 and 126 as shown in FIG. 9 containing one of Cr carbide, Ti carbide, V carbide, Nb carbide, Cr nitride, Ti nitride, V nitride, and Nb nitride on their entire sliding surfaces.

While the pins 115 in the chain 100 of this embodiment have the hardened surface layer 116 covering their entire outer circumferential surface, the hardened surface layer 116 may cover at least part of the outer circumferential surface of the pins 115 that slides against the inner circumferential surface of the bushings 125.

The bushings 125 have the hardened surface layer 126 covering the inner circumferential surface, which is the sliding surface that slides against the outer circumferential surface of the pins 115. In an alternative configuration, the hardened surface layer may also be provided to both end faces of the bushings 125 that make contact with inner side faces of the outer link plates 111, and to an outer circumferential surface of the bushings 125.

The bushings 125 in the chain 100 of this embodiment should also preferably have a concave inner circumferential surface.

Fifth Embodiment

Figure 10:
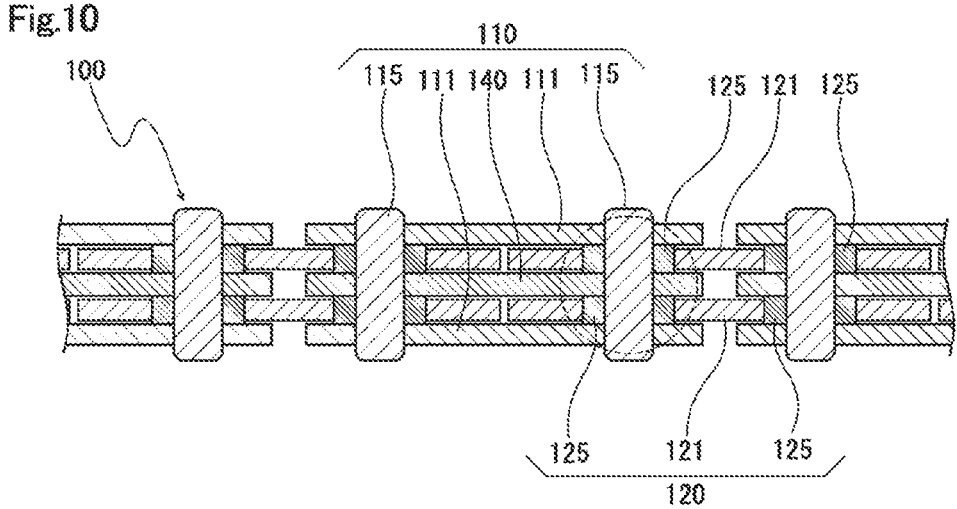
FIG. 10 is a cross-sectional view illustrating part of one configuration example of a chain according to a fifth embodiment of the present invention.

FIG. 10 is a cross-sectional view illustrating part of one configuration example of a chain according to a fifth embodiment of the present invention.

This chain 100 is configured as a bushed silent chain and includes outer link plates 111, middle link plates 140, inner link plates 121, pins 115, and bushings 125 as the chain components.

More specifically, the chain 100 of this embodiment is made up of a plurality of outer links 110 that form guide rows, and a plurality of inner links 120 that form non-guide rows.

The outer links 110 each include a pair of left and right outer link plates 111 formed with a pair of front and rear pin holes, a pair of front and rear pins 115 pressed into the pin holes of the outer link plates 111 and fixed at both ends, and a middle link plate 140 disposed between the pair of left and right outer link plates 111 with the pins 115 passed through the pair of front and rear pin holes.

The inner links 120 each include a plurality of inner link plates 121 each disposed between the outer link plate 111 and the middle link plate 140 and formed with a pair of front and rear pin holes, and bushings 125 fixedly pressed into the pin holes in each inner link plate 121.

These plurality of outer links 110 and inner links 120 are alternately and pivotably coupled together along the longitudinal direction of the chain by the pins 115 inserted in the bushings 125.

Figure 11:
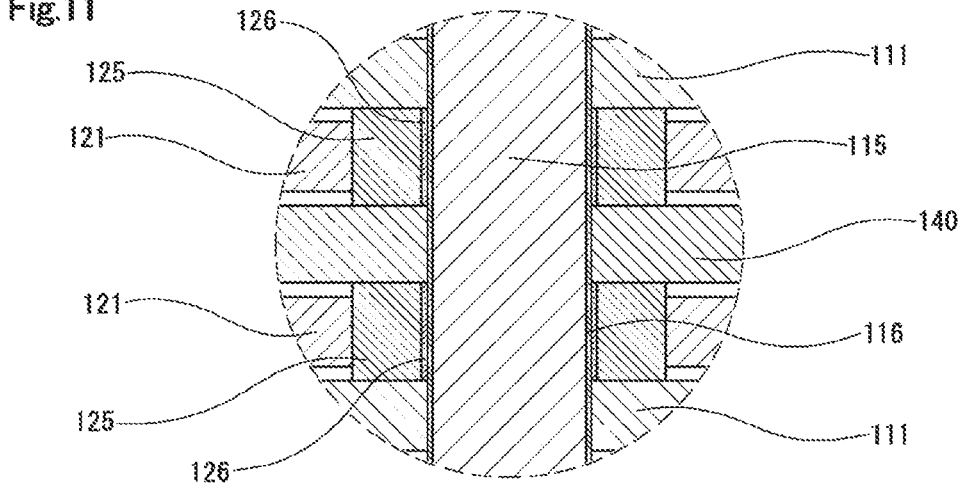
FIG. 11 is an enlarged view illustrating the part encircled with a broken line in FIG. 10.

In the chain 100 according to this embodiment, the pins 115, and bushings 125, which are mutually sliding chain components sliding against the pins 115, are formed with hardened surface layers 116 and 126 as shown in FIG. 11 containing one of Cr carbide, Ti carbide, V carbide, Nb carbide, Cr nitride, Ti nitride, V nitride, and Nb nitride on their entire sliding surfaces.

While the pins 115 in the chain 100 of this embodiment have the hardened surface layer 116 covering their entire outer circumferential surface, the hardened surface layer may cover at least part of the outer circumferential surface of the pins 115 that slides against the inner circumferential surface of the bushings 125.

The bushings 125 have the hardened surface layer 126 covering their inner circumferential surface, which is the sliding surface that slides against the outer circumferential surface of the pins 115. In an alternative configuration, the hardened surface layer may also be provided to both end faces of the bushings 125 that make contact with inner side faces of the outer link plates 111 and one side face of the middle link plate 140, and to an outer circumferential surface of the bushings 125.

The bushings 125 in the chain 100 of this embodiment should also preferably have a concave inner circumferential surface.

Below, a wear test carried out to investigate the characteristics of the chain according to the present invention is described.

A roller chain with the configuration shown in FIG. 1 and FIG. 2 according to the present invention was prepared for the test (hereinafter referred to as Invention Product 1). The chain has an 8 mm pitch.

The hardened surface layer formed on each of the outer circumferential surface of the pins and the inner circumferential surface of the bushings of the Invention Product 1 was 15 μm thick and contained a chromium carbide layer or a vanadium carbide layer. The sliding surface hardness of the hardened surface layer was adjusted to a Vickers hardness number of 2500 HV. The sliding surface roughness Rk on the hardened surface layer of the pins and the sliding surface roughness Rk on the hardened surface layer of the bushings were adjusted to the range of 0.04 μm to 0.30 μm and 0.8 μm to 2.0 μm, respectively.

Roller chains having the same configuration as that of the Invention Product 1 except that the hardened surface layer of the pins and the hardened surface layer of the bushings both have a sliding surface hardness of 1900 HV (hereinafter referred to as Invention Product 2), and except that the hardened surface layer of the pins and the hardened surface layer of the bushings both have a sliding surface hardness of 3200 HV (hereinafter referred to as Invention Product 3), were prepared.

Further, a roller chain having the same configuration as that of the Invention Product 1 except that the hardened surface layer of the pins has a sliding surface roughness Rk of 0.04 μm and the hardened surface layer of the bushings has a sliding surface roughness Rk of 0.73 μm was prepared (hereinafter referred to as Comparison Product 1).

Further, a roller chain having the same configuration as that of the Invention Product 1 except that the hardened surface layer of the pins has a sliding surface roughness Rk of 0.36 μm was prepared (hereinafter referred to as Comparison Product 2).

Further, a roller chain having the same configuration as that of the Invention Product 1 except that the hardened surface layer of the bushings has a sliding surface roughness Rk of 2.4 μm was prepared (hereinafter referred to as Comparison Product 3).

Moreover, a roller chain having the same configuration as that of the Invention Product 1 except that the hardened surface layer is formed only on the outer circumferential surface of the pins and not on the inner circumferential surface of the bushings was prepared (hereinafter referred to as Normal Product).

A wear test was conducted with the following test conditions on the Invention Products 1 to 3, Comparison Products 1 to 3, and Normal Product, and relative values of the total amount of wear on the pins and bushings in each of the Invention Products 1 to 3 and Comparison Products 1 to 3 were determined relative to the total amount of wear on the pins and bushings in the Normal Product, which is taken as 100%. The results are shown in Table 1 below.

Wear-Induced Elongation Test Conditions

Number of Sprocket Teeth: 18×36

Rotation Speed: 3000 r/min

Lubricating Oil: Contaminated oil, prepared by adding 11 mass % silicon particles (average size 17 μm) and 9 mass % alumina particles (average size 17 μm) in normal engine oil.

Oil Amount: 1 L/min

The results of the chain elongation test conducted on the invention products and the normal product and comparison products for comparison are based only on the outcome of a chain elongation test that was conducted using normal motor test equipment under the above conditions. The above test is a highly reproducible method commonly used in the art and therefore it is assumed that other test methods will produce results with a similar tendency.

TABLE 1

| | Total Amount of Wear (Relative Value) |
|---|---|
| Invention Product 1 | 53 [%] |
| Invention Product 2 | 61 [%] |
| Invention Product 3 | 66 [%] |
| Comparison Product 1 | 80 [%] |
| Comparison Product 2 | 71 [%] |
| Comparison Product 3 | 76 [%] |

As is clear from the results shown in Table 1, it was confirmed that the amount of wear could be significantly reduced in Invention Products 1 to 3 compared to Normal Product. An almost ½ reduction in the amount of wear was confirmed in Invention Product 1 in particular as compared to the normal product.

The amount of wear in each of Comparison Products 1 to 3 was smaller than that of the normal product, but larger than that of Invention Products 1 to 3, which confirmed poorer wear resistance of the pins and bushings.

While embodiments of the present invention have been described in detail, the present invention is not limited to the embodiments described above and may be carried out with various design changes without departing from the scope of the present invention set forth in the claims.

For example, the roller chain according to the first embodiment, and bushed silent chains according to the fourth and fifth embodiments were described as being configured with the bushings being fixedly pressed into the inner link plates at both ends. As long as the chain is configured such that the inner link plates are arranged at fixed intervals, the bushings need not necessarily be fixedly pressed into the inner link plates.

What is claimed is:

1. A chain comprising at least a plurality of link plates, a plurality of mutually sliding chain components and a plurality of pins, the mutually sliding chain components being the bushings fitted on the pins, the pins and the mutually sliding chain components sliding against the pins being formed with a hardened surface layer containing one of Cr carbide, Ti carbide, V carbide, Nb carbide, Cr nitride, Ti nitride, V nitride, and Nb nitride on part or all of respective sliding surfaces, and wherein the bushings have a first end face, a second end face, a cylindrical outer surface and an inner circumferential surface, the inner circumferential surface is concave such that a gap is formed between corresponding ones of the pins and the bushings, and the gap increases from the first and second end faces toward a center in a longitudinal direction of the corresponding bushings, wherein the hardened surface layer is provided to the concave inner circumferential surface.

2. The chain according to claim 1, wherein the hardened surface layer of the pins has a smaller sliding surface roughness than the hardened surface layer of the bushings.

3. The chain according to claim 2, wherein the hardened surface layer of the pins has a sliding surface roughness Rk of 0.04 μm to 0.30 μm, and the hardened surface layer of the bushings has a sliding surface roughness Rk of 0.8 μm to 2.0 μm.

4. The chain according to claim 1, wherein the hardened surface layer of the pins and the hardened surface layer of the bushings each have a sliding surface hardness of 1600 HV or more and 3500 HV or less.

5. The chain according to claim 1, wherein the plurality of link plates include outer link plates, the first and second end faces of the bushings make contact with inner side faces of the outer link plates, and the hardened surface layer is provided to the first and second end faces of the bushings.

6. The chain according to claim 1, further comprising a plurality of rollers, the plurality of rollers have an inner circumferential surface surrounding and making contact with the cylindrical outer surface of the bushings, respectively, the hardened surface layer is provided to the cylindrical outer surface of the bushings.

*     *     *     *     *